United States Patent [19]

Ardizio

[11] 4,195,795
[45] Apr. 1, 1980

[54] WINDING UP DEVICE FOR A SAFETY BELT

[76] Inventor: Pierre Ardizio, Rue de Saint-Jean 21, 1203 Geneve; Geneva, Switzerland

[21] Appl. No.: 970,273

[22] Filed: Dec. 18, 1978

[30] Foreign Application Priority Data

Dec. 21, 1977 [CH] Switzerland ............... 15780/77

[51] Int. Cl.² ............... A62B 35/02; B65H 75/48
[52] U.S. Cl. ............... 242/107.4 A; 188/136; 188/139; 188/71.1; 242/107.2
[58] Field of Search ............... 242/107.4 R–107.4 E, 242/107.3, 107.2, 107.6, 107.7, 99, 156, 156.2, 84.53; 188/135, 136, 139, 82.8, 70 R, 71.1

[56] References Cited

U.S. PATENT DOCUMENTS

| 2,246,863 | 6/1941 | Smellie | 242/107.2 X |
| 2,266,237 | 12/1941 | Newell | 188/82.8 X |
| 3,086,620 | 4/1963 | Elfes | 188/70 R |
| 3,343,763 | 9/1967 | Spouge | 242/107.4 A |
| 3,480,228 | 11/1969 | Ulert | 242/156 X |
| 3,930,682 | 1/1976 | Booth | 242/107.2 X |
| 4,101,092 | 7/1978 | Schmelow | 242/107.4 B |

Primary Examiner—John M. Jillions
Attorney, Agent, or Firm—Silverman, Cass & Singer, Ltd.

[57] ABSTRACT

A device for winding up a safety belt is locked in response to a change of inertia of the device housing. The device includes two elements at least one of which is a rotatable member having a pulley at one end with a band wound around it. An end of the band extends from the pulley and is connected to the safety belt. One end of the rotatable member is arranged adjacent the other element in the housing. A locking member is moved by its own inertia in response to an inertial change in the device housing and is engaged between the two elements to lock rotation of the rotatable member.

23 Claims, 7 Drawing Figures

WINDING UP DEVICE FOR A SAFETY BELT

BACKGROUND OF THE INVENTION

The present invention relates to a winding up or take up device for a safety belt.

SUMMARY OF THE INVENTION

This device is characterized by the fact that it comprises a wedge-shaped movable member which is moved by its inertia, and is engaged between two elements of the device. At least one of the elements is constituted by a rotatable member rigidly connected with a drum on which is wound a flexible band so that, when the wedge shaped member engages between the elements, it locks the one rotation of the elements which is constituted by the rotatable member.

BRIEF DESRIPTION OF THE INVENTION

The drawing shows, by way of example, one embodiment of the invention and several modifications.

DESCRIPTION OF THE PREFERRED EMBODIMENT

Figure 1:
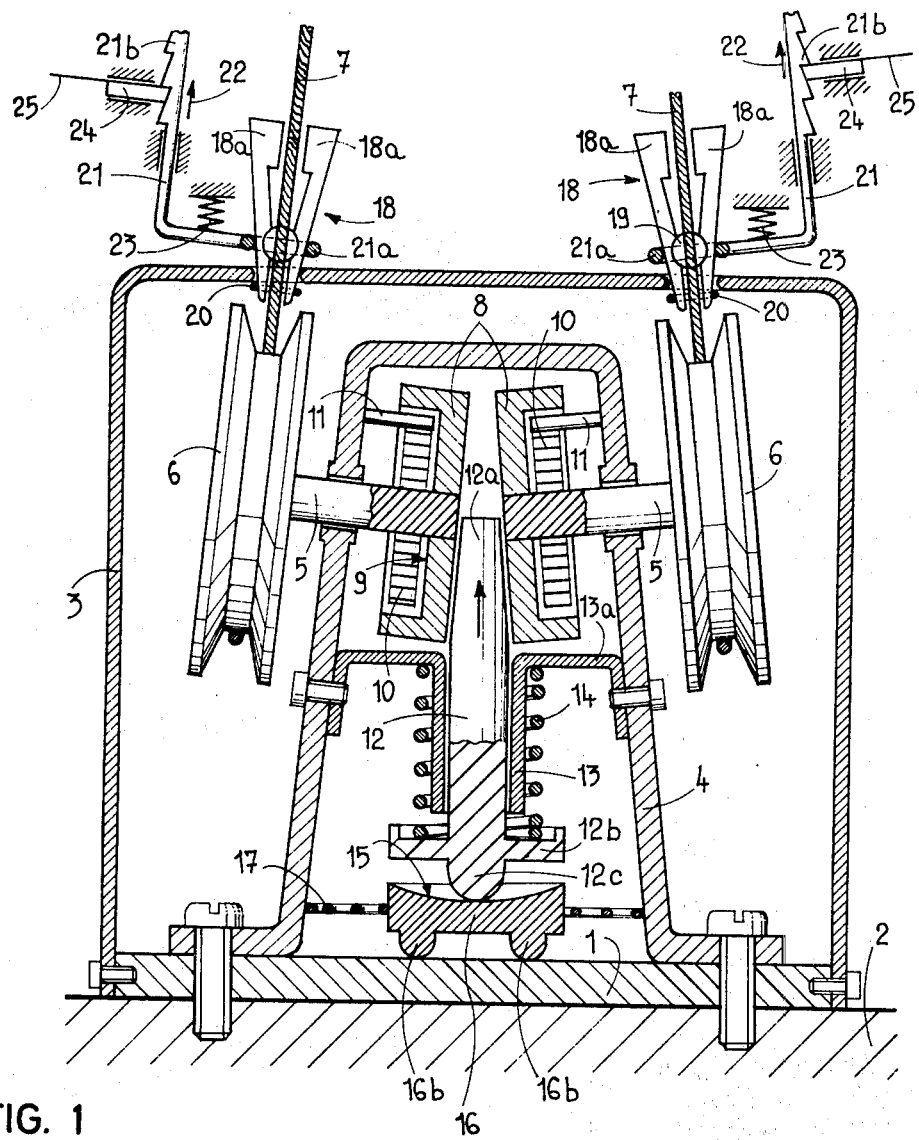
FIG. 1 is a sectional view of a winding up device for a safety belt.

The device represented in FIG. 1 comprises a baseplate 1 intended to be secured to an element of a motor vehicle, diagrammatically represented at 2, the base plate 1 carrying a housing 3. The frame 4 of the apparatus is secured to the base-plate 1 and carries two shafts 5 which are slightly inclined with respect to each other. At an end of each shaft is secured a pulley 6 on which is wound a cable 7. Each of the cables 7 are connected to a safety belt which is not represented.

Each shaft 5 carries, at its end opposite the pulley 6, a disc or plate 8 having the shape of a drum and being provided with an inner recess 9. In recess 9 is located an helicoidal blade spring 10 the inner end of which is connected to the shaft 5 and the outer end of which is secured to a pin 11 carried by the frame 4. When a traction force is exerted on one or the other of the cables 7, the corresponding spring 10 is wound and is armed to the later the return of cable.

So that the locking of the two cables 7 is ensured in the case of shock or of sudden braking of the vehicle, the device includes locking means comprising a locking stem 12 slidably mounted in a sleeve 13 which is secured to the frame 4 by a base 13a. The end 12a of locking stem 12 has the shape of a wedge adapted to be engaged between the two discs 8 but is shown out from the center thereof. This locking stem 12 is provided with a shoulder 12b which bears a coil return spring 14. Spring 14 surrounds the sleeve 13 and bears on the base 13a of sleeve 13. The locking stem 12 is ended, beyond its shoulder 12b, by a protrusion 12c the end of which is spherical and bears on a concave surface 15 of a control member 16 having the shape of a cap. Control member 16 bears, through spherical feet 16b, on the baseplate 1. A hair spring 17 maintains the control member 16 in its centered position as represented in the drawing.

It results from this arrangement that when a sudden deceleration or acceleration of the vehicle occurs, in any direction, the control member 16 is moved laterally, by inertia. This movement produces, by reason of the concavity of surface 15, an axial displacement of the stem 12 with the wedge-shaped portion 12a being wedged between the two discs 8, and locking these two discs.

The device represented comprises moreover means allowing the user, when he has closed his belt, to interrupt the effect of the traction force produced by the springs 10 which effect can be constricting or uncomfortable.

These interrupt means comprise two small pinches 18, each having two jaws 18a. Each pinch is traversed by one of the cables 7, and the jaws 18a are articulated one to each other at 19 by additional mean not represented. A wire spring 20 acts on these jaws for maintaining them in their open position as represented in the drawing. Each small pinch 18 is provided with a control stem 21 which is constituted by a bent stem able to slide in the direction of arrow 22 and which is ended by a portion 21a having the shape of a loop which surrounds the two jaws 18a. When control stem 21 is moved by the user in the direction of the arrow 22, counter to action of a return spring 23, it ensures tightening of the jaws 18a which lock the cable 7 and prevent the corresponding spring 10 from exerting thereon a traction force which would be transmitted to the belt. Moreover, a slight displacement of the cable 7 produced by a displacement of the small pinch 18 through the effect of a displacement of the control stem 21 slightly slackens the belt and ensures the user a maximum of comfort.

Control stem 21 is ended by a portion 21b having the shape of a rack which cooperates with a stop member 24 sliding longitudinally and serving to maintain the control system 21 in its rest position. This stop member 24 can be connected, by a cable 25, to the hanging device of the belt in such a way that, at the moment when the user unhooks the belt, the control member 21 is automatically released, which ensures the loosening of the small pinch 18 and allows the winding up device to operate normally.

If the user makes a movement which requires the belt to move, the control member 21 of the small pinch 18 remains in place with the small pinch alone moving with the cable. When the user returns to their normal position, the small pinch returns to the contact of control member 21. Consequently, during this movement, the user is submitted to the traction or return force of the spring 10 of the winding up device.

Figure 2:
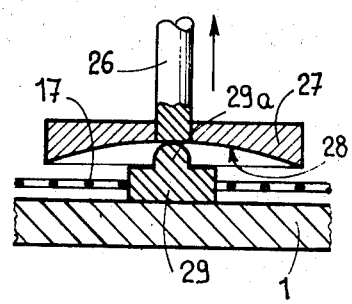
FIG. 2 is a sectional view of a detail of a modification.

The modification of FIG. 2 distinguishes from the embodiment as hereinbefore disclosed and represented by the fact that the locking stem 12 is replaced by a locking stem 26 rigidly connected with a base 27, the face 28 of which is situated opposite the base-plate 1 and is concave. Control member 29 is provided with a half spherical protrusion 29a on which the base 27 is bearing through concave surface 28. The lateral displacements of the control member 29 which are produced by inertia, produce the axial displacement of the locking stem 26.

Figure 3:
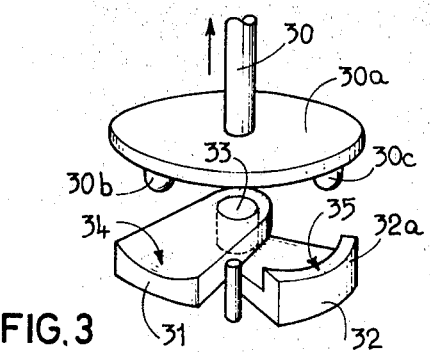
FIGS. 3 and 4 are perspective views of a detail of two other modifications.

In the modification of FIG. 3, a locking stem, 30, is provided with a base 30a which is provided with two spherical protrusions 30b and 30c. Protrusions 30b and 30c cooperate, respectively, with two control members 31 and 32 which can both oscillate freely and independently from each other around an axis 33 coaxial with the locking stem 30. The control member 31 is provided with a concave surface 34 which bears the protrusion 30b of the base 30a. The control member 32 is provided with an edge 32a the upper face of which is also concave, at 35, and cooperates with the protrusion 30c of the base 30a.

Depending on the direction in which sudden accelerations or decelerations of the vehicle are produced, one or the other or both of the control members 31 and 32, may be moved, by inertia and produce the axial displacement of the locking stem 30.

Figure 4:
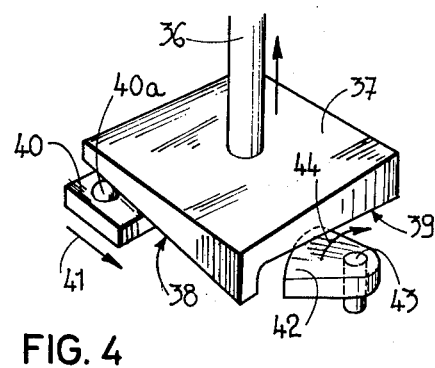

In the modification of FIG. 4, locking stem 36, is rigidly connected with a square base 37 provided with two inclined planes 38 and 39, whose planes are perpendicular to each other. A control member 40, sliding in the direction of arrow 41, bears, through a protrusion 40a, on the inclined plane 38, while a control member 42, articulated at 43 moves in the direction of arrow 44 and cooperates with the inclined plane 39.

One or the other or both of these control members 41 and 42, may, when moved by inertia, produce the axial displacement of the locking stem 36.

Figure 5:
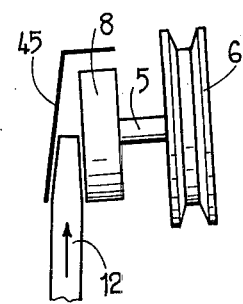
FIGS. 5, 6 and 7 are elevational views of a detail of three other modifications.

In the embodiment of FIG. 1, the device is a double winding up device, for two belts, and is secured in the middle of the vehicle between the two front seats. However, the present winding up device can be applied to a single belt, as diagrammatically represented in FIG. 5. In this case, the locking stem 12 acts on a single disc 8 and is sustained, at the side, opposite disc 8 by a member 45 of the frame, which can be constituted by the frame 4 itself.

Figure 6:
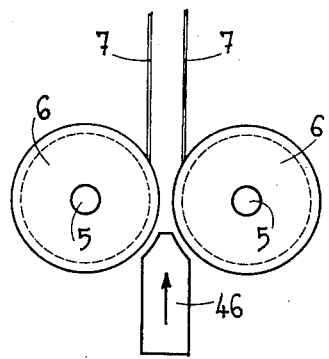

In the embodiment of FIG. 1, the stem 12 acts on the axial face of the two discs 8 the axes of which are inclined relative to each other but are situated in a same plane. In the modification of FIG. 6, a locking stem 46, having the shape of a wedge, acts directly on the pulleys 6 of the cables 7, these pulleys having their axes 5 parallel to each other.

Figure 7:
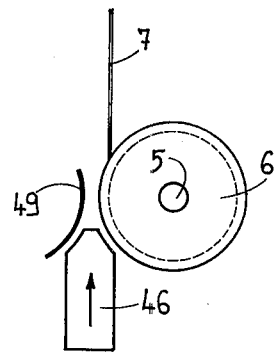

This modification can be also applied to the case where the winding up device is provided for a single belt, in which case the locking stem 46 will act on a single pulley 6 and will be sustained by a stationary bearing member 49, as represented in FIG. 7.

What I claim is:

1. A device for winding up safety belts comprising:
   a housing;
   two members each rotatable around a respective longitudinal axis and each being coupled to said housing, each member having opposite ends, with a disc rigidly connected on one of said ends, and a pulley rigidly connected on the other of said ends, a respective flexible band secured at one end thereof to each pulley and wound around said pulley, a free end of each band extending from its associated pulley and coupling the band to its respective safety belt, the members being arranged in said housing with said discs adjacent each other; and
   a wedge shaped member coupled to said housing, said wedge shaped member being moved by its inertia in response to inertial changes in said housing to a position between said members and in said position engaging said discs to lock said rotation of said members.

2. The device as claimed in claim 1 in which said wedge shaped member engages on a surface of each disc which is normal to the longitudinal axis of its respective member with the engagement being outward from the longitudinal axis of each member.

3. The device as claimed in claim 1 in which said wedge shaped member engages on a circumferential surface of each disc the engagement being tangential with the longitudinal axis of each member.

4. The device as claimed in claim 1 in which the wedge-shaped member is one end of a stem having two ends which is axially movable and in which there is a control member coupled between said stem and said housing, said control member having a surface bearing the other end of said stem and being moved by its inertia radially relative to said stem axis in response to inertial changes in said housing, one of said stem other end and said control member surface including a plane inclined relative to the axis of said stem so that relative movement between said control member and said stem radially of said stem axis axially moves said stem wedge shaped end to said position engaging said discs.

5. The device as claimed in claim 4 in which said stem other end includes a base having a concave surface bearing on said control member surface so that radial displacement of said control member relative to said stem axis axially moves said stem wedge shaped end to said position engaging said discs.

6. The device as claimed in claim 4 in which there are two control members, each being moved by its inertia in a direction perpendicular to the other and in a plane perpendicular to the stem axis in response to a change in said housing inertia, and in which said stem includes a base including two planes inclined relative to the control member plane of movement with each plane running in a direction parallel to one of said two control members and bearing on the same, so that displacement of at least one control member axially moves said stem wedge shaped end to said position engaging said discs.

7. The device as claimed in claim 4 in which there are two control members, each being moved by its inertia in a direction perpendicular to the other and in a plane perpendicular to said stem axis in response to a change in said housing inertia, each control member including a plane surface inclined relative to its plane of movement and bearing on its plane surface a protrusion from a base on said stem other end so that movement of at least one control member axially moves said stem wedge shaped end to said position engaging said discs.

8. The device as claimed in claim 1 in which the flexible band is a cable and in which there are retaining means coupled to said housing and traversed by said cable for locking the movement of said cable and thereby relieving the traction force exerted on the belt by the device and experienced by the user, said retaining means including two jaws arranged with said cable between them and including tightening means arranged around said jaws for compressing said cable between said jaws.

9. The device as claimed in claim 8 in which said tightening means include a means for further slightly extending said cable from said device when said tightening means compress said cable between said jaws to produce a slight slackening of the belt.

10. A device for winding up a safety belt comprising:
    a housing;
    two elements coupled to said housing, at least one of said elements being a member rotatable around a longitudinal axis and having two opposed ends with a pulley rigidly connected on one of said ends, a flexible band secured at one end thereof to said pulley and wound around said pulley, a free end of said band extending from said pulley and coupling said band to the safety belt, said elements being arranged in said housing with an end of said one element adjacent the other element;

a locking stem coupled to said housing, and having two opposed ends, one end of which is wedge shaped, said locking stem being axially movable to engage said wedge shaped end between said two elements and lock at least said rotation of said one element; and a control member coupled between said housing and the other end of said locking stem, said control member including a concave surface bearing the other end of said locking stem, said control member being displaced radially by its inertia from said locking stem axis in response to inertial changes in said housing and thereby axially moving said locking stem wedge shaped end into engagement between said two elements to lock at least said rotation of said one element.

11. The device as claimed in claim 10 in which there is a hair spring coupling said control member to said housing, said control member being maintained in a centered position relative to the axis of said locking stem by said hair spring while said control member is at rest.

12. A device for winding up a safety belt comprising: a housing, two elements coupled to said housing, at least one of said elements being a member rotatable around a longitudinal axis thereof and having two opposed ends with a pulley rigidly connected on one of said ends, a flexible band secured at one end thereof to said pulley and wound around said pulley, a free end of said band extending from said pulley and coupling said band to the safety belt, said elements being arranged in said housing with an end of said member adjacent the other element; and lock member means coupled to said housing for locking at least said rotation of said one element by engaging said elements between said elements, said lock member means being moved into engagement between said elements by its inertia in response to a change in the housing inertia.

13. The device as claimed in claim 12 in which each element includes a member with a disc rigidly connected on the other of said ends of said member, said members being arranged in said housing with said discs adjacent each other.

14. The device as claimed in claim 12 in which said lock member means engages on a surface of each disc which is normal to the longitudinal axis of its respective member with the engagement being outward from the longitudinal axis of each member.

15. The device as claimed in claim 12 in which said locking member means engages in a circumferential surface of each disc, the engagement being tangential with the longitudinal axis of each member.

16. The device as claimed in claim 12 in which said lock member means include a stem which is axially movable and which has two opposed ends, one end of which is wedge shaped, with said wedge shaped end being engagable between said elements, and which include a control member coupled between said stem and said housing, said control member having a surface bearing the other end of said stem and being moved by its inertia radially from said stem axis in response to a change in said housing inertia, one of said stem other end and said control member surface being a plane inclined relative to said stem axis, so that a relative movement between said stem and control member axially moves said stem wedge shaped end into engagement between said elements.

17. The device as claimed in claim 16 in which said control member surface bearing said stem other end is concave so that displacement of said control member radially of said stem axially moves said stem wedge shaped end into engagement between said elements.

18. The device as claimed in claim 17 in which there is a hair spring coupling said control member to said housing and which maintains said control member centered relative to said stem axis when said control member is at rest.

19. The device as claimed in claim 16 in which said stem includes a base having a concave face bearing on said control member so that displacement of said control member radially of said stem axis axially moves said stem wedge shaped end into engagement between said elements.

20. The device as claimed in claim 16 in which said lock member means include two control members, each being moved by its inertia in a direction perpendicular to the other and in a plane perpendicular to said stem axis in response to a change in said housing inertia, and in which said stem includes a base including two planes inclined relative to said control member plane of movement with each plane running in a direction parallel to one of said control members and bearing on the same, so that displacement of at least one control member axially moves said stem wedge shaped end into engagement between said elements.

21. The device as claimed in 16 in which said locking member means include two control members, each being moved by its inertia in a direction perpendicular to the other and in a plane perpendicular to said stem axis in response to a change in said housing inertia, each control member including a plane surface inclined relative to its plane of movement and bearing on its plane surface a protrusion from a base on said stem other end so that movement of at least one control member axially moves said stem wedge shaped end into engagement between said elements.

22. The device as claimed in claim 12 in which said flexible band is a cable and in which there are retaining means coupled to said housing and traversed by said cable for locking movement of said cable and thereby relieving the traction force exerted on the belt by the device and experienced by the user, said retaining means including two jaws arranged with said cable between them and including tightening means arranged around said jaws for compressing said cable between said jaws.

23. The device as claimed in claim 22 in which said tightening means include means for further slightly extending said cable from said device when said tightening means compress said cable between said jaws to produce a slight slackening of the belt.

* * * * *